(12) United States Patent
Blackburn et al.

(10) Patent No.: US 11,237,847 B1
(45) Date of Patent: Feb. 1, 2022

(54) AUTOMATED STANDARDS-BASED COMPUTING SYSTEM RECONFIGURATION

(71) Applicant: Wells Fargo Bank, N.A., San Francisco, CA (US)

(72) Inventors: Justin Christopher Blackburn, Gallatin Gateway, MT (US); Jeremy Daniel Blackburn, Tempe, AZ (US); Jacob Tyler Blackburn, Phoenix, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 109 days.

(21) Appl. No.: 16/721,863

(22) Filed: Dec. 19, 2019

(51) Int. Cl.
*G06F 9/44* (2018.01)
*G06F 9/445* (2018.01)
*G06F 9/54* (2006.01)

(52) U.S. Cl.
CPC .......... *G06F 9/44505* (2013.01); *G06F 9/542* (2013.01)

(58) Field of Classification Search
CPC .......................... G06F 9/4411; G06F 9/44505
USPC ......................................................... 713/100
See application file for complete search history.

(56) References Cited

U.S. PATENT DOCUMENTS

| | | |
|---|---|---|
| 6,675,164 B2 | 1/2004 | Kamath et al. |
| 7,174,507 B2 | 2/2007 | Baudin et al. |
| 7,546,383 B2 | 6/2009 | Smith et al. |
| 7,562,004 B2* | 7/2009 | Osogami ............ G06F 9/44505 703/13 |
| 7,760,746 B2 | 7/2010 | Betts et al. |
| 7,849,048 B2 | 12/2010 | Langseth et al. |
| 8,285,844 B2 | 10/2012 | Hussaini et al. |
| 8,352,388 B2 | 1/2013 | Estes |
| 9,092,502 B1 | 7/2015 | Cannaliato et al. |
| 9,098,587 B2 | 8/2015 | Deshmukh et al. |
| 9,141,691 B2 | 9/2015 | Goerke et al. |
| 9,665,088 B2 | 5/2017 | Nixon et al. |
| 9,864,659 B2 | 1/2018 | Roehrsheim et al. |

(Continued)

FOREIGN PATENT DOCUMENTS

| | | |
|---|---|---|
| CN | 109298840 A | 2/2019 |
| WO | WO-2016153790 A1 | 9/2016 |

OTHER PUBLICATIONS

Chun-Nan, Hsu, et al., "Generating finite-state transducers for semi-structured data extraction from the Web", Information Systems, vol. 23, No. 8, (Dec. 15, 1998), 521-538.

(Continued)

*Primary Examiner* — Andy Ho
(74) *Attorney, Agent, or Firm* — Schwegman Lundberg & Woessner, P.A.

(57) ABSTRACT

Systems and techniques for automated standards-based computing system reconfiguration are described herein. An existing configuration may be obtained of a first computing system operating in a first computing environment. A second computing system in a second computing environment may be identified that provides a function of the first computing system using the existing configuration. A second computing system existing configuration of the second computing system may be evaluated to identify a set of configuration deviations. A notification may be transmitted to a computing device of an administrator of the second computing system. The notification may include an indication of the set of configuration deviations.

21 Claims, 5 Drawing Sheets

(56) References Cited

U.S. PATENT DOCUMENTS

| | | |
|---|---|---|
| 9,916,107 B2 * | 3/2018 | Bolik .................. G06F 16/23 |
| 9,917,735 B2 | 3/2018 | Park |
| 9,959,324 B2 | 5/2018 | Dantressangle et al. |
| 9,977,617 B2 | 5/2018 | Bolik et al. |
| 10,037,194 B2 | 7/2018 | Beck et al. |
| 10,142,204 B2 | 11/2018 | Nickolov et al. |
| 10,177,998 B2 | 1/2019 | Parandehgheibi et al. |
| 2004/0167911 A1 | 8/2004 | Wakefield et al. |
| 2005/0080811 A1 | 4/2005 | Speeter et al. |
| 2010/0217944 A1 | 8/2010 | Dehaan et al. |
| 2014/0089474 A1 | 3/2014 | Zenz et al. |
| 2016/0357424 A1 | 12/2016 | Pang et al. |
| 2016/0359678 A1 | 12/2016 | Madani et al. |
| 2017/0017708 A1 | 1/2017 | Fuchs et al. |
| 2017/0098242 A1 | 4/2017 | Gould et al. |
| 2017/0353991 A1 | 12/2017 | Tapia |
| 2018/0025061 A1 | 1/2018 | Dantressangle et al. |
| 2018/0069747 A1 | 3/2018 | Kraus et al. |
| 2018/0075104 A1 | 3/2018 | Oberbreckling et al. |
| 2018/0316562 A1 | 11/2018 | Lepp et al. |
| 2019/0066112 A1 | 2/2019 | Adjaoute |
| 2021/0064644 A1 * | 3/2021 | Lippsett .............. G06F 16/338 |

OTHER PUBLICATIONS

Talavera, Elena, et al., "Mining Student Data To Characterize Similar Behavior Groups In Unstructured Collaboration Spaces", [Online], Retrieved from the Internet: <URL: https://pdfs.semanticscholar.org/12fd/4b8d22052875064d43b6a7c4cfcf7f499872.pdf> (Aug. 10, 2004), 5 pgs.

* cited by examiner

AUTOMATED STANDARDS-BASED COMPUTING SYSTEM RECONFIGURATION

TECHNICAL FIELD

Embodiments described herein generally relate to computer infrastructure management and, in some embodiments, more specifically to automatic reconfiguration of computing environments for standard convergence.

BACKGROUND

An enterprise computing infrastructure may include many computing devices (e.g., hundreds, thousands, etc.). The infrastructure may have a variety of software applications executing on the computing devices that provide a variety of functions. Some of the software applications may provide similar functions. Configuration of a software application may vary from instance to instance. An administrator may desire to migrate an existing infrastructure to a new infrastructure environment. It may be desirable to determine a standard software application and corresponding configuration for a function to be provided in the new infrastructure to reduce complexity of the computing environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An enterprise computing environment may include hundreds or thousands of applications running on a variety of computing systems throughout the computing environment. Various administrative teams may be responsible for implementing and supporting a function (e.g., a web-based product delivery function, a human resources computing system, an enterprise resource planning computing system, etc.) provided by the computing environment. Each administrative team may have a collection of applications used by its respective function and with which members of the administrative team may be familiar. As each administrative team implements applications from the collection, the complexity of the computing environment grows. Without a definition of computing standards (e.g., software application standards, computing hardware standards, etc.,), the complexity of the environment may become unmanageable. For example, the vast array of various software applications may create security vulnerabilities because software updates and security patches may be missed.

The problem of a non-standardized computing environment may be highlighted in preparation for a migration from an existing computing environment to a new computing environment. Each function of the computing environment may need to be reestablished in the new computing environment. A non-standardized environment may be more costly and time consuming to migrate because of the vast variety of applications and configurations that may need to be recreated in the new computing environment.

For example, several business unit silos may each manage its own servers and middleware. Each may have set its own standards causing multiple different configuration options, file locations, and compliance scanning issues. An enterprise computing environment may include 250,000 middleware servers and the accompanying administrative staff. The servers may have hundreds of configuration options spread across dozens of files for each individual possible software package that may be installed. Traditional inventories may capture a small fraction of this information.

To address the problem of non-standard computing environments, the entirety of the server configuration is scanned for middleware including all of the configuration files and places them into a big data processing platform (e.g., APACHE HADOOP®, etc.). Data may be collected for multiple different middleware applications so that configurations for various platforms that provide a feature may be compared. For example, configurations for web server applications such as APACHE® HTTP Server, APACHE TOMCAT® Application Server, IBM® HTTP Server, IBM® WebSphere, and ORACLE® WEBLOGIC® to determine where each is installed. The data is analyzed using artificial intelligence (AI) to determine where software is installed and to identify interconnections between servers. The analysis may functionally look at how the enterprise is structured and may identify on an item by item basis a standard configuration. Many items such as proxy or database configurations may be used by multiple middleware applications and may be standardized across multiple seemingly unrelated software applications. For example, files with like functions may be placed in the same location for different software applications. The determined standards may be used as inputs for automated systems for reconfiguring the existing computing environment and for migrating the existing computing environment to a new standardized computing environment. This may assist in compliance efforts to keep the computing environment secure. The systems and techniques may be applied universally across industries and may be used in conjunction with a variety of computing system administration tools (e.g., orchestration, security, performance management, development, etc.) for evaluating massive computing environments to develop standards.

Figure 1:
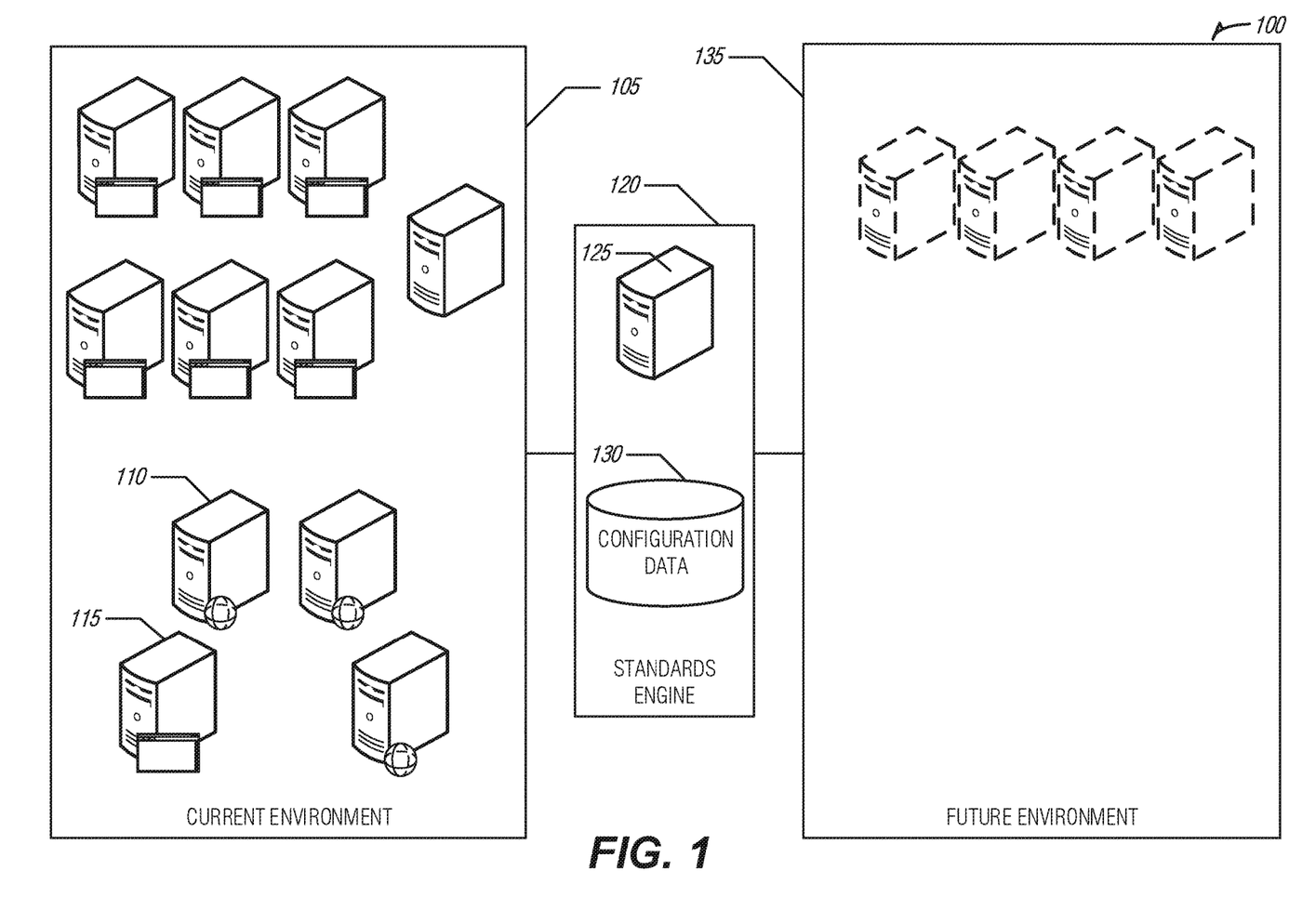
FIG. 1 is a block diagram of an example of an environment for automated standards-based computing system reconfiguration, according to an embodiment.

FIG. 1 is a block diagram of an example of an environment 100 for automated standards-based computing system reconfiguration, according to an embodiment. The environment 100 may include an existing computing environment 105 (e.g., brownfield, etc.) and a new computing environment 135 (e.g., greenfield, etc.). A standards engine 120 may collect data from the existing computing environment 120 that may be used in the creation of computing systems in the new computing environment 135.

The existing computing environment 105 may include a variety of systems including webservers 110 and application servers 115. Each of the computing systems may execute a variety of software applications such as middleware. The standards engine 120 may include one or more scanning servers 125 that collect configuration data from the computing systems and store the configuration data in a configuration database 130. In an example, the configuration database 130 may be structured, unstructured, and in other formats that may be suitable for effective analysis of big datasets.

In an example, the existing computing environment 105 may include several applications that provide web server functionality to computing systems in the existing computing environment 105. In another example, the existing computing environment 105 may include several applications that provide database server functionality to computing systems in the existing computing environment 105. Each instance (e.g., each executing instantiation of an application, etc.) may have a configuration. The configuration may include a variety of configuration items such as, installation location, configuration file location, configuration files, configuration settings (e.g., as defined in the configuration files, operating system registry, etc.), etc. For example, the configuration may include a heap size, port numbers, installation directory, modules used, option flags, and the like.

The scanning servers 125 may scan the existing computing environment 105 to collect the configuration data from the computing systems operating in the existing computing environment 105. The configuration data may be stored in the configuration database 130. Artificial intelligence, machine learning, and deep learning techniques may be used to analyze the configuration data to identify standard configurations. The standard configurations may be used to reconfigure the existing computing environment 105 and may be used to orchestrate creation of computing systems in the new computing environment 135.

Figure 2:
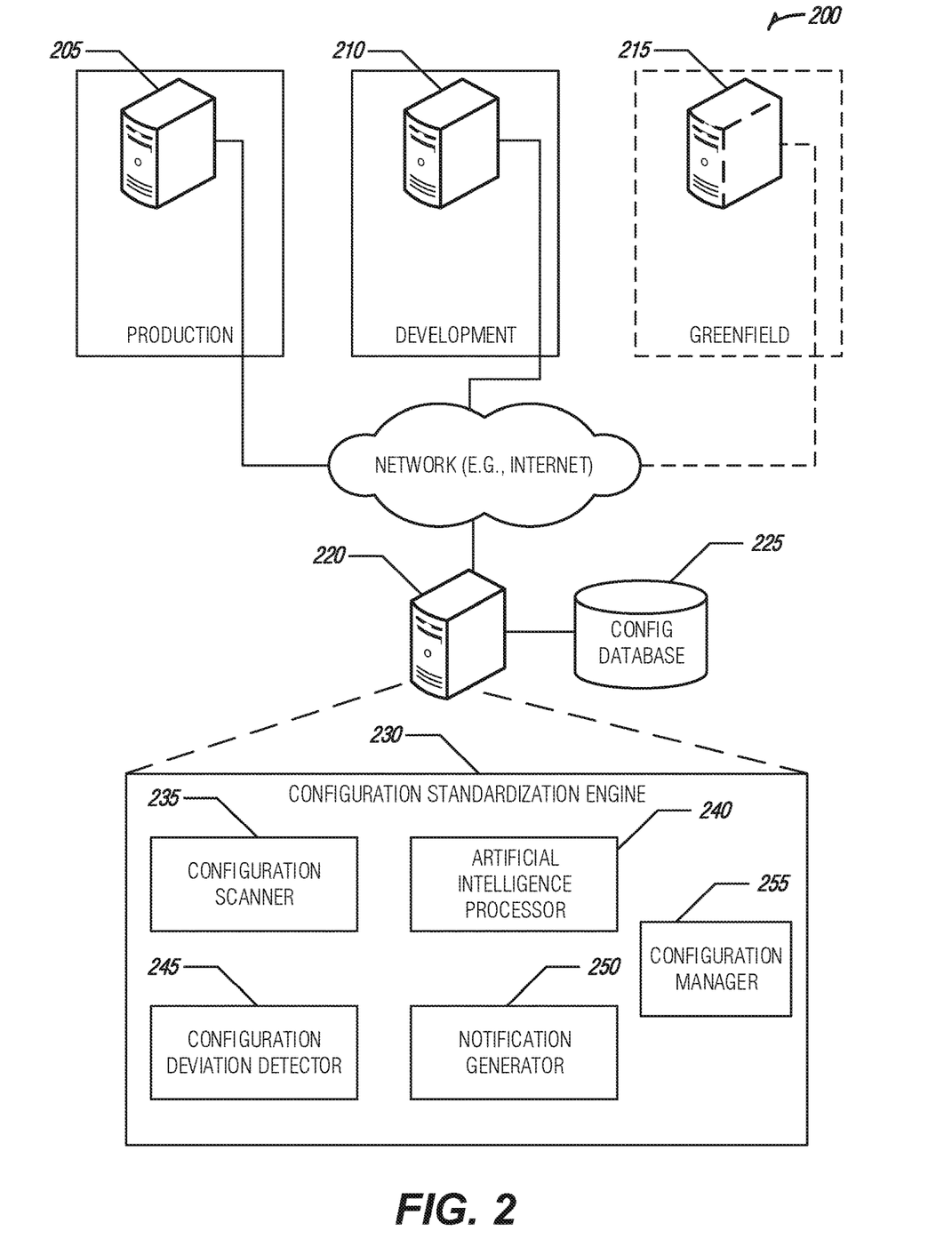
FIG. 2 is a block diagram of an example of an environment and a system for automated standards-based computing system reconfiguration, according to an embodiment.

FIG. 2 is a block diagram of an example of an environment 200 and a system 230 for automated standards-based computing system reconfiguration, according to an embodiment. The environment 200 may include a first computing system 205 operating in a first computing environment (e.g., a production computing environment, etc.), a second computing system 210 operating in a second computing environment (e.g., a development computing environment, etc.). In an example, the environment 200 may include a third computing system 315 that may be installed in a future computing environment (e.g., a greenfield computing environment, etc.). The first computing system 205, the second computing system 210, and the third computing system 215 may be communicatively coupled (e.g., via wired network, wireless network, cellular network, the internet, etc.) to a configuration management server 220 (e.g., stand-alone server, server cluster, cloud-based service, virtual server, field programmable gate array (FPGA), application specific integrated circuit (ASIC), etc.). The configuration management server 220 may be communicatively coupled to a configuration database 225. The configuration management server 220 may include (e.g., operating as software implemented in computer-readable memory, etc.) the system 230. In an example, the system may be a configuration standardization engine. The system 230 may include a variety of components such as, a configuration scanner 235, an artificial intelligence processor 240, a configuration deviation detector 245, a notification generator 250, and a configuration manager 255.

The configuration scanner 235 may obtain an existing configuration of the first computing system 205 operating in a first computing environment. The configuration scanner 235 may scan computing systems (e.g., first computing system 205, second computing system 210, etc.) to identify applications executing thereon. For example, the configuration scanner may use agent-based or agentless data collection techniques to inventory each of the computing systems to identify the applications. The configuration scanner 235 may collect configurations of the computing systems to determine parameters for the various instances of existing software applications executing on the computing systems. The parameters may include a variety of settings for the existing software application such as, installation directory, port numbers, heap sizes, configuration file locations, version information, database connections, and the like. The configuration scanner 220 may store the configuration data in the configuration database 225.

An enterprise computing environment may have a variety of computing environments such as productions, development, staging, disaster recovery, etc. Each environment may include one or more computing systems that provide similar functionality to each environment. For example, an accounting application may run on a similar computing infrastructure stack in each environment. It may be ideal to maintain identical configurations across the computing environments so that software code may be developed and seamlessly distributed across each environment without errors caused by configuration differences. To address the issue of configuration inconsistency and related technical errors, computing systems that provide the same (or similar) functions may be identified in each environment. The computing systems in each environment may then be analyzed and reconfigured to converge on a single unified configuration that is consistent across the computing environments.

The artificial intelligence processor 240 may identify the second computing system 210 in a second computing environment that provides a function of the first computing system 205 using the existing configuration. In an example, the second computing system includes processing the existing configuration and the second computing system configuration using artificial intelligence to identify similarities between the first computing system 205 and the second computing system 210. In an example, the artificial intelligence processor 240 may use a variety of similarity matching techniques such as regression, classification, ranking, etc. to identify the second computing system 210. For example, parameters included in the existing configuration may be input and a configuration model may be generated for the existing configuration and parameters of computing systems operating in the second computing environment may be evaluated using the configuration model to identify that the second computing system 210 is the most similar computing system to the first computing system 205 operating in the second computing environment. For example, it may be determined that a web server providing a customer portal may be identified in the production environment and, based on the configuration information, a corresponding development web server that hosts the customer portal may be identified in the development environment as the second computing system.

The configuration deviation detector 245 may evaluate a second computing system existing configuration of the second computing system 210 to identify a set of configuration deviations. For example, a production server and a development server may execute a web server application and the configuration options and parameters of the development server may be compared to the configuration options of the production server to determine differences between the respective configurations. For example, the development server may have a different heap size and timeout value than the production server and the difference between the timeout value and the heap size may be identified as deviations and added to the set of deviations.

The notification generator 250 may transmit a notification to a computing device of an administrator of the second computing system 210. The notification may include an indication of the set of configuration deviations. In an example, a deviation graphical user interface may be presented to the computing device of the administrator of the second computing system 210. The deviation graphical user interface may include a graphical representation of the set of configuration deviations and one or more interactive controls to receive input. For example, a configuration of the production server and the configuration of the development server may be presented side-by-side with the deviations highlighted. A control such as an accept button may be place next to each deviation that upon selection transmits an indication that a configuration change for the corresponding deviation should be made (e.g., by reconfiguring the development server with the same vale as the production server, etc.). In another example, a text input box or other control may be placed next to a deviation that allows the administrator to input a reason for the deviation. Upon submission, an indication may be transmitted that indicates an automatic reconfiguration to address the deviation should not be made. In an example, an exception to a deviation may cause a message to be transmitted to a supervisor, a review panel, or other body responsible for approving exceptions.

The configuration manager 255 may generate reconfiguration commands and may transmit reconfiguration commands to computing systems to be reconfigured. In an example, a response may be received to the notification and the second computing system 210 may be reconfigured by the configuration generator 255 based on the response using the set of configuration deviations. For example, an administrator may approve remediation of the heap size and timeout value deviations and upon receiving the response the development server may be reconfigured. In an example, a change control notification may be generated by the configuration manager 255 and transmitted to a change control system upon receipt of the response. The reconfiguration may be delayed for a period of time (e.g., a day, until the next maintenance window, etc.) to allow interested parties time to reschedule implementation of the reconfiguration.

A standard configuration for a software application or computing system may be known. It may, therefore, be desired to update multiple computing systems that provide a similar function in the various computing environment in parallel to converge to the standard configuration. In an example, a standard configuration may be determined for an existing software application executing on the first computing system 205 and the second computing system 210. The existing configuration and the second computing system existing configuration may be evaluated by the configuration deviation detector 245 to identify respective deviations from the standard configuration and the notification may include an indication of the respective deviations. For example, the configurations for the web server application executing on the production server and the development server may deviate from the standard configuration. The notification may include the deviation of the development server from the production server as well as the deviation of both computing systems from the standard configuration.

The subsequent operation upon receiving a response would be similar as that discussed above in reference to deviations between the development server and the production server. In an example, a response may be received to the notification and the first computing system 205 and the second computing system 210 may be reconfigured by the configuration manager 255 based on the response using the respective deviations. Thus, deviations between the production and development servers may automatically be remediated at the same time as automatic remediation of deviations of both systems from the standard configuration.

The system and techniques discussed herein may also be used to migrate from an existing computing environment to a new computing environment or a computing environment to be implemented. In an example, a standard configuration may be obtained for an existing software application executing on the first computing system 205. The existing configuration to the standard configuration to identify a set of standards deviations. A standards deviation notification may be transmitted to a computing device of an administrator of the first computing system 205. A configuration may be generated for a target software application to be installed on the third computing system 215 in a third computing environment using a response received in response to the notification and the set of standards deviations. For example, the web server configuration of the production server may be evaluated and compared to a standard configuration for the web server. The administrator may approve or request an exception to the deviations and based on the response, a configuration (e.g., build script, orchestration command, etc.) may be generated that may be used in automatic creation of the new computing environment. Thus, the new computing environment may be implemented as close to the standard implementation as possible.

Figure 3:
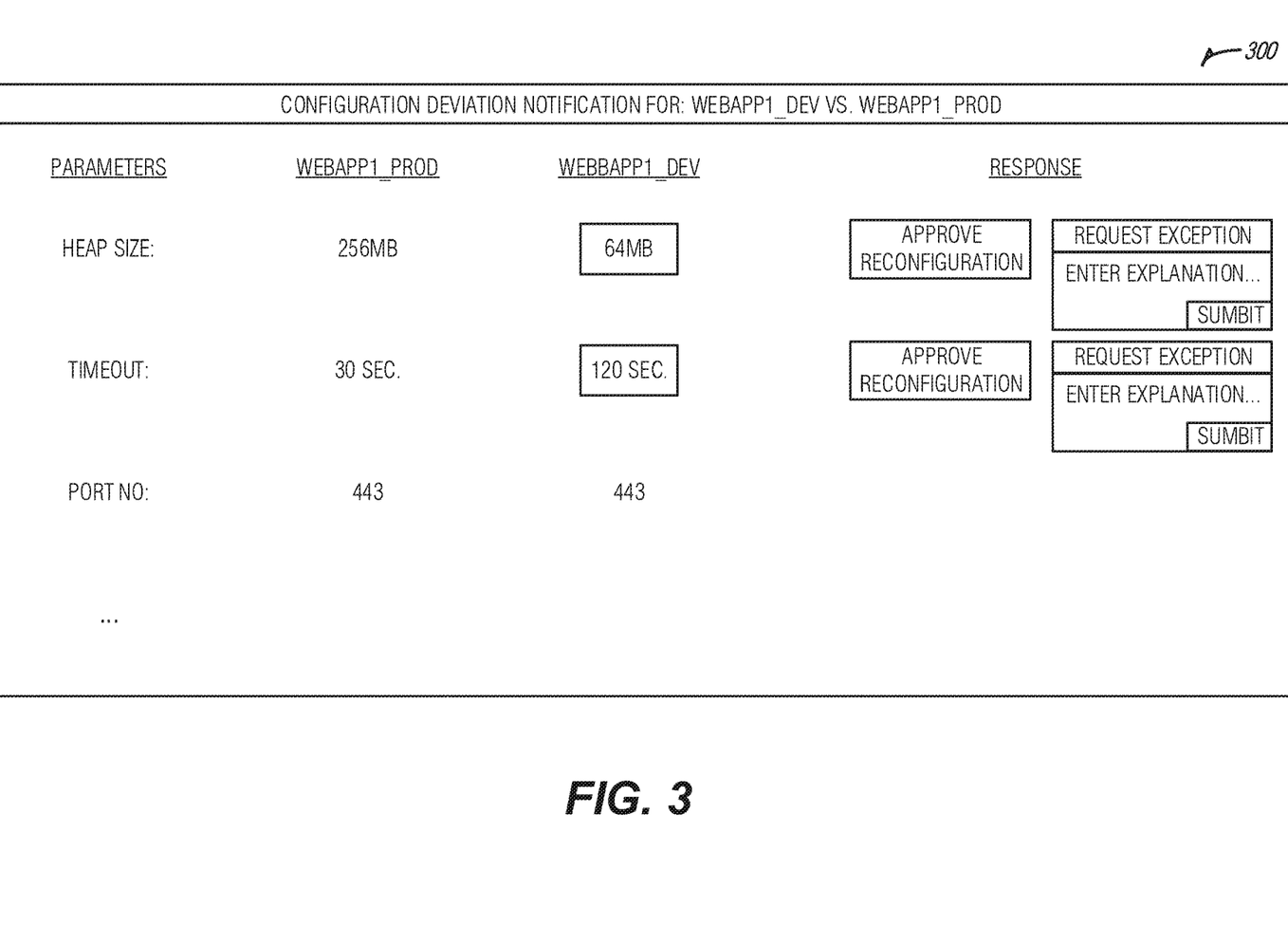
FIG. 3 is a block diagram of an example of a configuration notification user interface for automated standards-based computing system reconfiguration, according to an embodiment.

FIG. 3 is a block diagram of an example of a configuration notification user interface 300 for automated standards-based computing system reconfiguration, according to an embodiment. The configuration notification user interface 300 may provide features as described in FIG. 2. The configuration notification user interface 300 may be presented to an administrator via computer display device and may display deviations between computing systems that are determined to have a similar function in various computing environments. The deviations may be highlighted so that the administrator may quickly identify configuration deviations to be addressed. The administrator may be provided with controls that allow the administrator to approve reconfiguration to the reference value (e.g., the vale for the reference server not highlighted in the user interface, etc.). The configuration notification user interface 300 may include a control that the administrator may use to request an exception for the deviation. For example, the administrator may have a test server configured differently while testing a new feature to be added to a software application and may not wish to have the test server reconfigured. The administrator may enter a reason in the text box and may submit the exception request. The request may then be forwarded to a supervisor, review panel, or other body responsible for approving exceptions. Upon receiving approval of the reconfiguration changes, the computing system may be automatically reconfigured to remediate the deviations.

Figure 4:
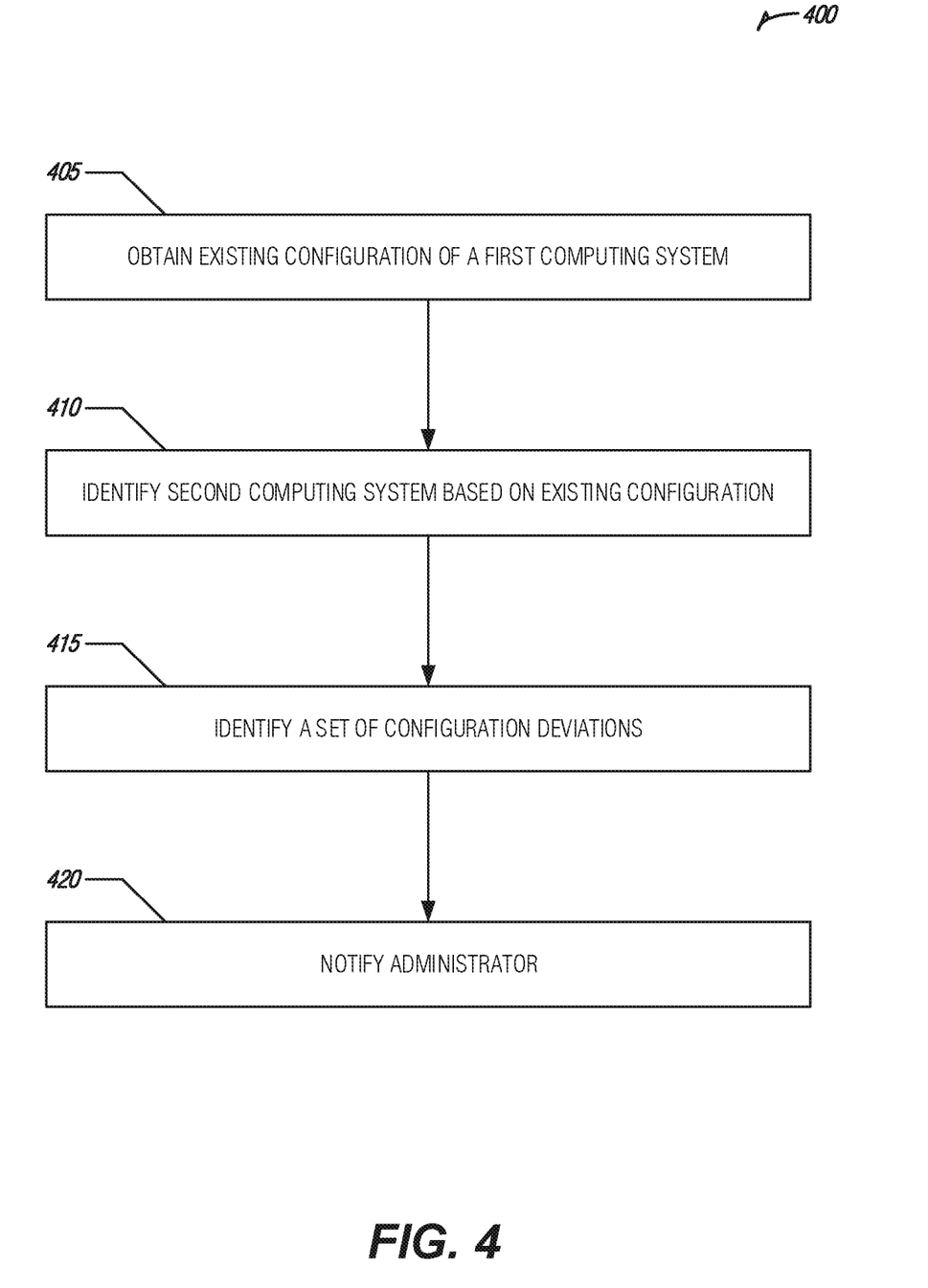
FIG. 4 is a flow diagram of an example of a method for automated standards-based computing system reconfiguration, according to an embodiment.

FIG. 4 is a flow diagram of an example of a method 400 for automated standards-based computing system reconfiguration, according to an embodiment. The method 400 may provide features as described in FIGS. 2 and 3.

An existing configuration may be obtained (e.g., by the configuration scanner 235 as described in FIG. 2, etc.) of a first computing system operating in a first computing environment (e.g., at operation 305).

A second computing system in a second computing environment may be identified (e.g., by the artificial intelligence processor 240 as described in FIG. 2, etc.) that provides a function of the first computing system using the existing configuration (e.g., at operation 310). In an example, identification of the second computing system may include processing the existing configuration and the second computing system configuration using artificial intelligence to identify similarities between the first computing system and the second computing system.

A second computing system existing configuration of the second computing system may be evaluated (e.g., by the configuration deviation detector 245, etc.) to identify a set of configuration deviations (e.g., at operation 315). A notification may be transmitted (e.g., by the notification generator 250 as described in FIG. 2, etc.) to a computing device of an administrator of the second computing system (e.g., at operation 320). The notification may include an indication of the set of configuration deviations. In an example, a response may be received to the notification and the second computing system may be reconfigured based on the response using the set of configuration deviations. In an example, a deviation graphical user interface may be presented to the computing device of the administrator of the second computing system. The deviation graphical user interface may include a graphical representation of the set of configuration deviations and one or more interactive controls to receive input. Upon receiving input from the one or more interactive controls, a reconfiguration change message may be transmitted to the second computing system.

In an example, a standard configuration may be determined for an existing software application executing on the first computing system and the second computing system. The existing configuration and the second computing system existing configuration may be evaluated to identify respective deviations from the standard configuration and the notification may include an indication of the respective deviations. In an example, a response may be received to the notification and the first computing system and the second computing system may be reconfigured based on the response using the respective deviations.

Figure 5:
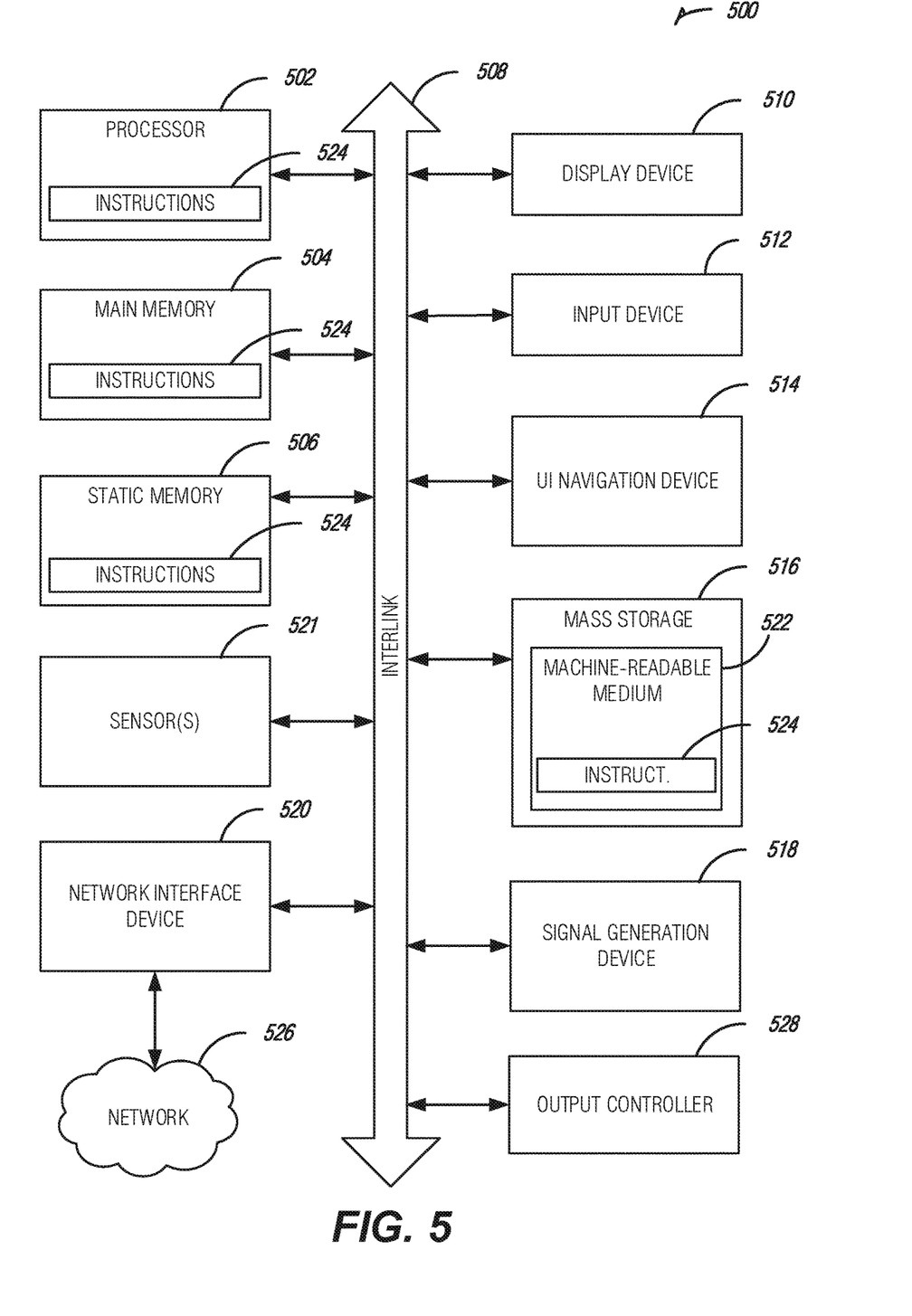
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for automated standards-based computing system reconfiguration, the system comprising:
   at least one processor; and
   memory including instructions that, when executed by the at least one processor, cause the at least one processor to perform operations to:
   obtain an existing configuration of a first computing system operating in a first computing environment by scanning the first computing system for application configuration files that include configuration data for an application executing on the first computing device, wherein the configuration data includes standard configuration parameters for the application executing on the first computing device that performs a specific service function;

identify a second computing system in a second computing environment that provides the service function of the first computing system using the configuration data;

evaluate a second computing system existing configuration of the second computing system to identify a set of configuration deviations between the standard configuration parameters and configuration parameters of the second computing system existing configuration; and transmit a notification to a computing device of an administrator of the second computing system, wherein the notification includes an indication of the set of configuration deviations.

2. The system of claim 1, the memory further comprising instructions that cause the at least one processor to perform operations to:

determine a standard configuration for an existing software application executing on the first computing system and the second computing system; and evaluate the existing configuration and the second computing system existing configuration to identify respective deviations from the standard configuration, wherein the notification includes an indication of the respective deviations.

3. The system of claim 2, the memory further comprising instructions that cause the at least one processor to perform operations to:

receive a response to the notification; and reconfigure the first computing system and the second computing system based on the response using the respective deviations.

4. The system of claim 1, the memory further comprising instructions that cause the at least one processor to perform operations to:

receive a response to the notification; and reconfigure the second computing system based on the response using the set of configuration deviations.

5. The system of claim 1, the memory further comprising instructions that cause the at least one processor to perform operations to:

obtain a standard configuration for an existing software application executing on the first computing system;

compare the existing configuration to the standard configuration to identify a set of standards deviations;

transmit a standards deviation notification to a computing device of an administrator of the first computing system; and generate a configuration for a target software application to be installed on a third computing system in a third computing environment using a response received in response to the notification and the set of standards deviations.

6. The system of claim 1, wherein the instructions to identify the second computing system include instructions to process the existing configuration and the second computing system configuration using artificial intelligence to identify similarities between the first computing system and the second computing system.

7. The system of claim 1, the memory further comprising instructions that cause the at least one processor to perform operations to:

present a deviation graphical user interface to the computing device of the administrator of the second computing system, wherein the deviation graphical user interface includes a graphical representation of the set of configuration deviations and one or more interactive controls to receive input; and upon receipt of input from the one or more interactive controls, transmit a reconfiguration change message to the second computing system.

8. At least one non-transitory machine-readable medium including instructions for automated standards-based computing system reconfiguration that, when executed by at least one processor, cause the at least one processor to perform operations to:

obtain an existing configuration of a first computing system operating in a first computing environment by scanning the first computing system for application configuration files that include configuration data for an application executing on the first computing device, wherein the configuration data includes standard configuration parameters for the application executing on the first computing device that performs a specific service function;

identify a second computing system in a second computing environment that provides the service function of the first computing system using the configuration data;

evaluate a second computing system existing configuration of the second computing system to identify a set of configuration deviations between the standard configuration parameters and configuration parameters of the second computing system existing configuration; and transmit a notification to a computing device of an administrator of the second computing system, wherein the notification includes an indication of the set of configuration deviations.

9. The at least one non-transitory machine-readable medium of claim 8, further comprising instructions that cause the at least one processor to perform operations to:

determine a standard configuration for an existing software application executing on the first computing system and the second computing system; and evaluate the existing configuration and the second computing system existing configuration to identify respective deviations from the standard configuration, wherein the notification includes an indication of the respective deviations.

10. The at least one non-transitory machine-readable medium of claim 9, further comprising instructions that cause the at least one processor to perform operations to:

receive a response to the notification; and reconfigure the first computing system and the second computing system based on the response using the respective deviations.

11. The at least one non-transitory machine-readable medium of claim 8, further comprising instructions that cause the at least one processor to perform operations to:

receive a response to the notification; and reconfigure the second computing system based on the response using the set of configuration deviations.

12. The at least one non-transitory machine-readable medium of claim 8, further comprising instructions that cause the at least one processor to perform operations to:

obtain a standard configuration for an existing software application executing on the first computing system;

compare the existing configuration to the standard configuration to identify a set of standards deviations;

transmit a standards deviation notification to a computing device of an administrator of the first computing system; and generate a configuration for a target software application to be installed on a third computing system in a third computing environment using a response received in response to the notification and the set of standards deviations.

13. The at least one non-transitory machine-readable medium of claim 8, wherein the instructions to identify the second computing system include instructions to process the existing configuration and the second computing system configuration using artificial intelligence to identify similarities between the first computing system and the second computing system.

14. The at least one non-transitory machine-readable medium of claim 8, further comprising instructions that cause the at least one processor to perform operations to:
present a deviation graphical user interface to the computing device of the administrator of the second computing system, wherein the deviation graphical user interface includes a graphical representation of the set of configuration deviations and one or more interactive controls to receive input; and
upon receipt of input from the one or more interactive controls, transmit a reconfiguration change message to the second computing system.

15. A method for automated standards-based computing system reconfiguration, comprising:
obtaining an existing configuration of a first computing system operating in a first computing environment by scanning the first computing system for application configuration files that include configuration data for an application executing on the first computing device, wherein the configuration data includes standard configuration parameters for the application executing on the first computing device that performs a specific service function;
identifying a second computing system in a second computing environment that provides the service function of the first computing system using the configuration data;
evaluating a second computing system existing configuration of the second computing system to identify a set of configuration deviations between the standard configuration parameters and configuration parameters of the second computing system existing configuration; and
transmitting a notification to a computing device of an administrator of the second computing system, the notification including an indication of the set of configuration deviations.

16. The method of claim 15, further comprising:
determining a standard configuration for an existing software application executing on the first computing system and the second computing system; and
evaluating the existing configuration and the second computing system existing configuration to identify respective deviations from the standard configuration, wherein the notification includes an indication of the respective deviations.

17. The method of claim 16, further comprising:
receiving a response to the notification; and
reconfiguring the first computing system and the second computing system based on the response using the respective deviations.

18. The method of claim 15, further comprising:
receiving a response to the notification; and
reconfiguring the second computing system based on the response using the set of configuration deviations.

19. The method of claim 15, further comprising:
obtaining a standard configuration for an existing software application executing on the first computing system;
comparing the existing configuration to the standard configuration to identify a set of standards deviations;
transmitting a standards deviation notification to a computing device of an administrator of the first computing system; and
generating a configuration for a target software application to be installed on a third computing system in a third computing environment using a response received in response to the notification and the set of standards deviations.

20. The method of claim 15, wherein identifying the second computing system includes processing the existing configuration and the second computing system configuration using artificial intelligence to identify similarities between the first computing system and the second computing system.

21. The method of claim 15, further comprising:
presenting a deviation graphical user interface to the computing device of the administrator of the second computing system, wherein the deviation graphical user interface includes a graphical representation of the set of configuration deviations and one or more interactive controls to receive input; and
upon receiving input from the one or more interactive controls, transmitting a reconfiguration change message to the second computing system.

* * * * *